US012746828B2

(12) United States Patent
Hustedt

(10) Patent No.: US 12,746,828 B2

(45) Date of Patent: Sep. 29, 2026

(54) EFFICIENT ADAPTABLE ELECTRIC VEHICLE POWERTRAIN ARCHITECTURE AND METHODS OF OPERATION

(71) Applicant: Exro Technologies Inc., Calgary (CA)

(72) Inventor: Eric Hustedt, Calgary (CA)

(73) Assignee: AESIRON TECHNOLOGIES INC., Calgary (CA)

( * ) Notice: Subject to any disclaimer, the term of this patent is extended or adjusted under 35 U.S.C. 154(b) by 0 days.

(21) Appl. No.: 18/677,376

(22) Filed: May 29, 2024

(65) Prior Publication Data

US 2024/0399887 A1 Dec. 5, 2024

Related U.S. Application Data

(60) Provisional application No. 63/469,617, filed on May 30, 2023.

(51) Int. Cl.

*B60L 15/20* (2006.01)
*B60L 58/10* (2019.01)
*B60L 58/30* (2019.01)

(52) U.S. Cl.

CPC ............... *B60L 15/20* (2013.01); *B60L 58/10* (2019.02); *B60L 58/30* (2019.02)

(58) Field of Classification Search

CPC ........... B60L 15/20; B60L 58/10; B60L 58/30
See application file for complete search history.

(56) References Cited

U.S. PATENT DOCUMENTS 4,484,083 A * 11/1984 Jefferies .................. B60K 6/30 180/65.245
5,541,494 A 7/1996 Sannomiya et al.
5,771,476 A * 6/1998 Mufford ............ H01M 8/04089 429/445
5,991,670 A * 11/1999 Mufford .................. B60L 58/30 429/513
6,886,647 B1 * 5/2005 Gotta .................. B60L 15/2009 180/65.285

(Continued)

FOREIGN PATENT DOCUMENTS

WO 2018213919 A1 11/2018
WO 2024113043 A1 6/2024

(Continued)

*Primary Examiner* — Gertrude Arthur Jeanglaude
(74) *Attorney, Agent, or Firm* — Cozen O'Connor

(57) ABSTRACT

An electric vehicle power train can advantageously combine two core technologies, a coil driver system and a power source (e.g., battery) control system (e.g., BCS) to demonstrate several system-level benefits. An electric vehicle power train can advantageously combine two core technologies, a coil driver system and a power source (e.g., fuel cell) control system to demonstrate several system-level benefits. An electric vehicle power train can advantageously include a battery and a BCS along with a fuel cell system. An electric vehicle power train can advantageously include a battery and a BCS without a fuel cell system. An electric vehicle power train can advantageously include a fuel cell system without a battery or a BCS. The coil driver system can implement, for example, two torque profiles within one electric machine by switching stator packs between a series arrangement of coils or windings and a parallel arrangement of coils.

17 Claims, 11 Drawing Sheets

(56) References Cited

U.S. PATENT DOCUMENTS

| | | | | |
|---|---|---|---|---|
| 7,081,696 | B2 | 7/2006 | Ritchey | |
| 8,008,888 | B2 * | 8/2011 | Oyobe | H02J 50/12 320/108 |
| 8,278,858 | B2 | 10/2012 | Fang et al. | |
| 9,812,981 | B2 | 11/2017 | Ritchey et al. | |
| 10,414,351 | B2 * | 9/2019 | Katano | B60R 16/0207 |
| 11,967,913 | B2 | 4/2024 | Hustedt | |
| 2015/0318772 | A1 * | 11/2015 | Jahshan | B60L 50/40 318/400.41 |
| 2021/0359523 | A1 | 11/2021 | Ritchey et al. | |
| 2022/0360091 | A1 | 11/2022 | Nguyen et al. | |
| 2022/0368135 | A1 | 11/2022 | Nguyen et al. | |
| 2023/0011977 | A1 | 1/2023 | Nguyen et al. | |
| 2023/0198445 | A1 | 6/2023 | Hustedt | |
| 2023/0264605 | A1 * | 8/2023 | Cheng | B60L 15/2045 307/9.1 |
| 2024/0399887 | A1 | 12/2024 | Hustedt | |
| 2025/0167573 | A1 | 5/2025 | Nguyen et al. | |
| 2025/0392243 | A1 | 12/2025 | Hustedt | |

FOREIGN PATENT DOCUMENTS

| | | | |
|---|---|---|---|
| WO | 2025029862 | A1 | 2/2025 |
| WO | 2025102169 | A1 | 5/2025 |

* cited by examiner

EFFICIENT ADAPTABLE ELECTRIC VEHICLE POWERTRAIN ARCHITECTURE AND METHODS OF OPERATION

CROSS-REFERENCE TO RELATED APPLICATIONS

This application claims benefit under 35 U.S. 119 (e) to U.S. provisional patent application 63/469,617 filed May 30, 2023.

TECHNOLOGICAL FIELD

This application generally relates to electrical vehicles and, more particularly, to powertrains for electric vehicles.

BACKGROUND

Electric Vehicle (EV) power trains typically include an electric energy supply, generally secondary batteries (energy storage) or a combination of secondary batteries and fuel cells (energy source), which power an electric motor drive system to ultimately provide tractive effort. The final drive for the "ideal" EV is a fixed single-gear reduction due to its simplicity and efficiency. However, challenges in sizing an electric machine (e.g., rotating electric machine such as an electric motor or generator) for the more demanding electrification applications such as heavy-duty trucking and high-performance cars often require the addition of multi-speed gearboxes adding further system complication and cost.

The system specifications are generally driven by maximum torque and speed specifications of the vehicle. This determines battery voltage, peak discharge current, electric machine size, inverter sizing, gear ratio/multispeed gearboxes, etc.

However, these system maximum performance specifications are much higher than typical use cases for these vehicles. This large gap between the specified peak performance and the typical use generates significant system inefficiencies.

The design challenge for these powertrains is to meet the large range of rotation speed (rpm) and torque used to fulfill requirements such as respectable "0-60 times" and high maximum speeds, while in parallel also obtaining good results for range and energy consumption in drive cycles such as the WLTP (Worldwide Harmonized Light Vehicle Test Procedure). FIG. 1 shows a typical motor performance curve with WLTP drive cycle superimposed.

Main Drivers of Losses (Part 1)

Electric Machine:

Primarily the energy loss in an electric machine is conduction loss in the windings (motor windings) due to current. Electric machines are the most efficient for a given operating point when all of the current flowing is purely contributing to producing shaft torque. Once a machine is above base speed and entering the field weakening region efficiency starts to decline significantly since ever-increasing amounts of stator current is not producing torque but rather is counteracting the rotor field. At this point, the electric machine is generating significant loss to simply continue operating with the voltage limit introduced by the inverter system.

Other contributors to losses as speed increases are alternating current (AC) loss due to eddy currents and reduced effective conductor area (e.g., skin and proximity effect), as well as hysteresis loss in the steel of the electric machine due to both the motor frequency and pulse width modulation (PWM) ripple current from the drive.

Inverter:

Losses in an inverter are largely driven by semiconductor losses, which take two primary forms, conduction loss, and switching loss, as well as some losses in the DC link capacitor and bus bars.

Conduction losses are those that are incurred by a device while current is flowing through it in its ON state. The only way to influence this is either to reduce the current or reduce the ON resistance in the case of field effect transistors (FETs) or saturated ON voltage in the case of bipolar junction transistors (BJTs)/insulated gate bipolar transistors (IGBTs), etc. In the case of resistance devices like metal oxide semiconductor field effect transistors (MOSFETs), affecting conduction loss is simple, simply add more devices in parallel. This of course leads to a cost versus losses trade-off.

Switching losses are those generated when the device transitions between states, either ON→OFF, or OFF→ON. During these transitions or "switching events" the device typically has both full current and full voltage. These events generate very large instantaneous power loss, in some cases up to megawatts (MW). The only saving grace is that these events are very short, generally between 10's of nanoseconds to a few microseconds depending on the type of device, etc. This means that while the power is very large, the total energy loss per event is relatively small. These events however are repeated very often, at the switching frequency, which for these types of inverters can range from 5 kHz to 20 KHz. Aside from changing the switching frequency (the less often a switching even happens, the less total energy loss there is), the most significant driver of switching loss for a given current is the switching time and the voltage to the device. For a given system, reducing switching time is generally limited due to other physical factors (e.g., turning OFF over-voltage) and it is typically already as fast as it can be.

Switching loss can be up to 50% of the total inverter loss, so reducing this can have a significant impact on overall system efficiency under certain operating conditions.

Main Drivers of Losses/Efficiency (Part 2)

Fuel Cell:

The output characteristic of a fuel cell is similar to a photovoltaic (PV) cell in that it has reducing voltage with increasing power that results in a singular point of voltage and current that generates maximum power output, and this combination of voltage and current is dependent on fuel flow. Unlike PV cells, where there is typically no interest in panel efficiency, just in maximum power generated, in a fuel cell efficiency is a concern since fuel is provided to and consumed by the fuel cell. A typical fuel cell performance curve is shown in the chart below FIG. 2. Efficiency is highest at low power, approaching 100% at zero power, however parasitic loss from things like pumps, fans, etc. used to operate the fuel cell reduces efficiency at very low loads (which causes the drop in system efficiency as power approaches 0). The polarization curve of a fuel cell is the cell voltage for a given current density.

Due to the large fuel cell voltage variation with load, and the resultant impact on efficiency, generally the output of a fuel cell is pre-buffered by a DC-DC converter to allow the fuel cell voltage to be independent of the system DC link (generally a battery). Since the full fuel cell power must always pass through a DC-DC converter, approximately 2-5% efficiency is lost due to the power conversion. The additional cost and weight of the converter are also factors.

Main Drivers of Losses (Part 3)

Gearbox:

Generally speaking, the mechanical output of an electric machine, operating as an electric motor in an electric vehicle, is not directly coupled to the traction wheels. Baring direct drive wheel motors, which are avoided for many reasons, all-electric drive trains connect the electric motor to the wheels via shafts, gears, and differentials. These components add cost and sap progressively more energy as the arrangement become progressively more complicated.

The ideal for electric vehicles is a fixed ratio single-speed reduction. This is the simplest, most efficient, and most reliable drive train. However, a single speed does force significant compromise on the system design, having to balance torque production at low speed with power requirements at high speed. These are conflicting requirements for an electric machine. For more demanding applications, this compromise is too great, and multi-speed gearboxes are employed (e.g., heavy-duty trucking, high-performance vehicles). The addition of multi-speed gearboxes is a significant jump in cost and complexity. Depending on how the multi-speed transmission is implemented results in either significant efficiency loss (dual clutch) or long shifting times (single clutch).

Each additional rotating gear set adds approximately 1.5% losses. 2-speed dual-clutch transmission can add a further approximately 2-4% losses.

BRIEF SUMMARY

As noted above in the Background section, switching losses are generated when the device transitions between states. Switching loss can be up to 50% of the total inverter loss, so reducing this can have a significant impact on overall system efficiency under certain operating conditions. Reducing switching time for a given system is generally limited due to various physical factors and it is typically already as fast as it can be. This leaves only the DC link voltage as an externally adjustable parameter for optimizing inverter loss.

As also noted above in the Background section, the output of a fuel cell is typically pre-buffered by a DC-DC converter to allow the fuel cell voltage to be independent of the system DC link (generally a battery). Since the full fuel cell power passes through a DC-DC converter, approximately 2-5% efficiency is lost due to the power conversion. The additional cost and weight of the converter are also factors. Thus, eliminating the DC-DC converter has an immediate positive impact on system efficiency and cost.

This application generally relates to electrical vehicles and, more particularly, to powertrains for electric vehicles.

In some implementations, the electric vehicle power train can advantageously combine two core technologies, a coil driver system and a power source (e.g., battery) control system (e.g., BCS) to demonstrate several system-level benefits.

In some implementations, the electric vehicle power train can advantageously combine two core technologies, a coil driver system and a power source (e.g., fuel cell) control system to demonstrate several system-level benefits.

In some implementations, the electric vehicle power train can advantageously include a battery and battery control system (BCS) along with a fuel cell system. In other implementations, the electric vehicle power train can advantageously include a battery and battery control system (BCS) without a fuel cell system. In yet other implementations, the electric vehicle power train can advantageously include a fuel cell system without a battery or a battery control system (BCS).

The coil driver system can configure the coils or windings of an electric machine (e.g., electric motor, electric generator) based at least in part on speed and torque demands. The coil driver system can, for example, configure the coils or windings of an electric machine to be in parallel with one another or in series with one another. The coil driver system can implement, for example, two torque profiles within one electric machine by switching stator packs between a series arrangement of coils or windings and a parallel arrangement of coils or windings (e.g., a 2:1 ratio of motor turns). Thus, the coil driver system can implement a series mode to produce a relatively high A-t (high torque) as well as a relatively high back electromotive force (BEMF) (low base speed). The same coil driver system can implement a parallel mode to produce a relatively low A-t (low torque) and a relatively low BEMF (high base speed). The two torque curves result in two distinct efficiency maps (e.g., FIGS. 6 and 7 for an interior permanent magnet (IPM) electrical machine), advantageously allowing more optimization options when developing electric vehicle drive systems.

The coil driver system can be operated to export power to an external power grid and/or to import power from an external power grid. In such implementations, the coils of windings of the coil driver system are advantageously employed as inductors to replicate operation of a dedicated power converter (e.g., inverter, rectifier, DC-DC voltage converter), thereby omitting the need for a dedicated power converter and the losses and costs associated with a dedicated power converter.

The power source or cell control system (e.g., a battery control system (BCS)) is operable to perform cell (e.g., battery cell) switching, implementing cell selection, active balancing, and/or advantageously a variable DC link voltage between the battery and the coil driver system.

When present the fuel cell system can be operated with a variable DC link voltage between the fuel cell and the coil driver system.

The various components and operational modes described herein can be combined with one another to realize further advantages.

BRIEF DESCRIPTION OF THE DRAWINGS

In the drawings, identical reference numbers identify similar elements or acts. The sizes and relative positions of elements in the drawings are not necessarily drawn to scale. Further, the particular shapes of the elements as drawn are not intended to convey any information regarding the actual shape of the particular elements, and have been solely selected for ease of recognition in the drawings. The various embodiments are illustrated by way of example and not by way of limitation in the accompanying Figures.

DETAILED DESCRIPTION

Figure 1:
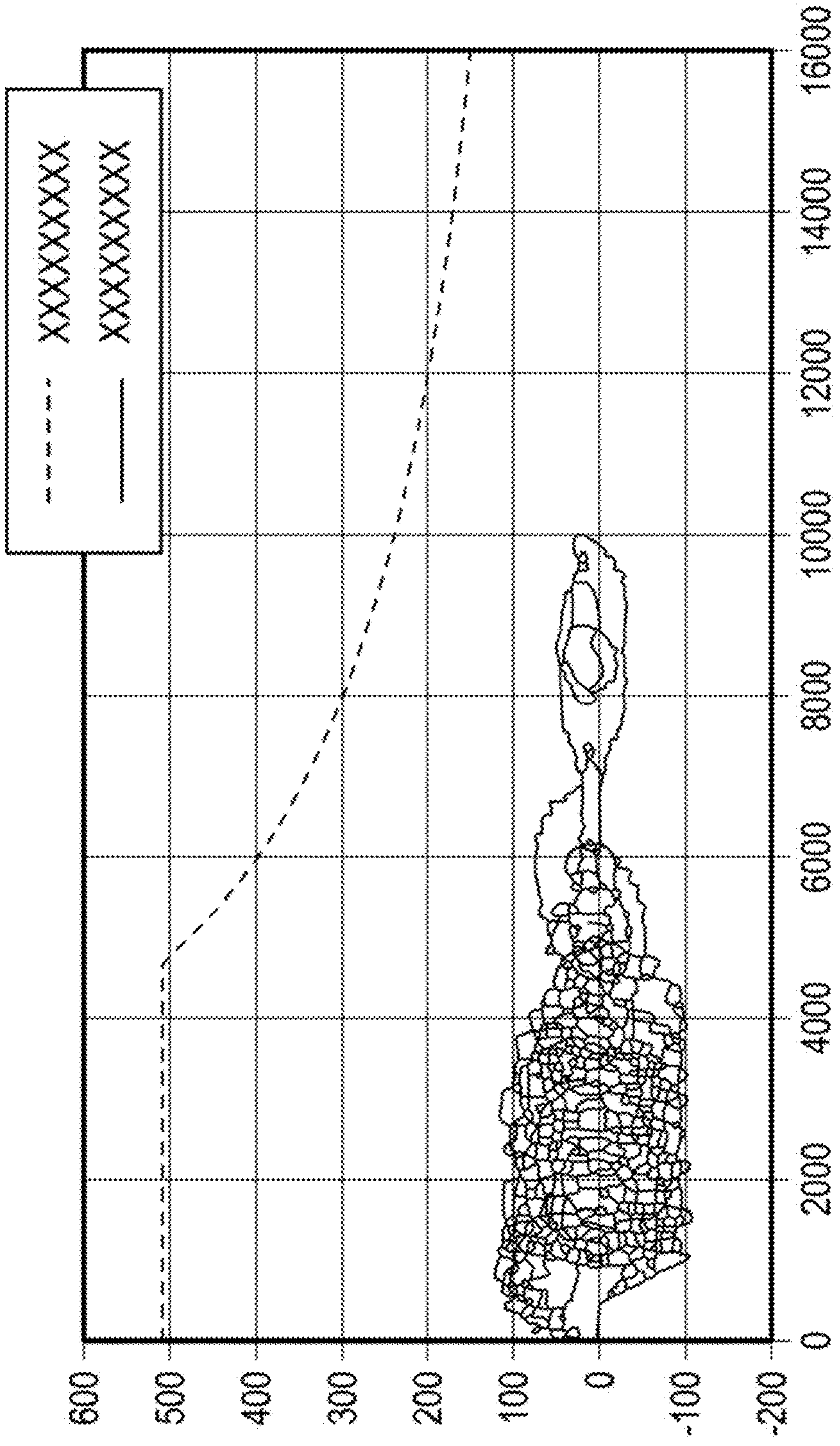
FIG. 1 is a graph showing a typical motor performance curve with WLTP drive cycle superimposed.
Figure 2:
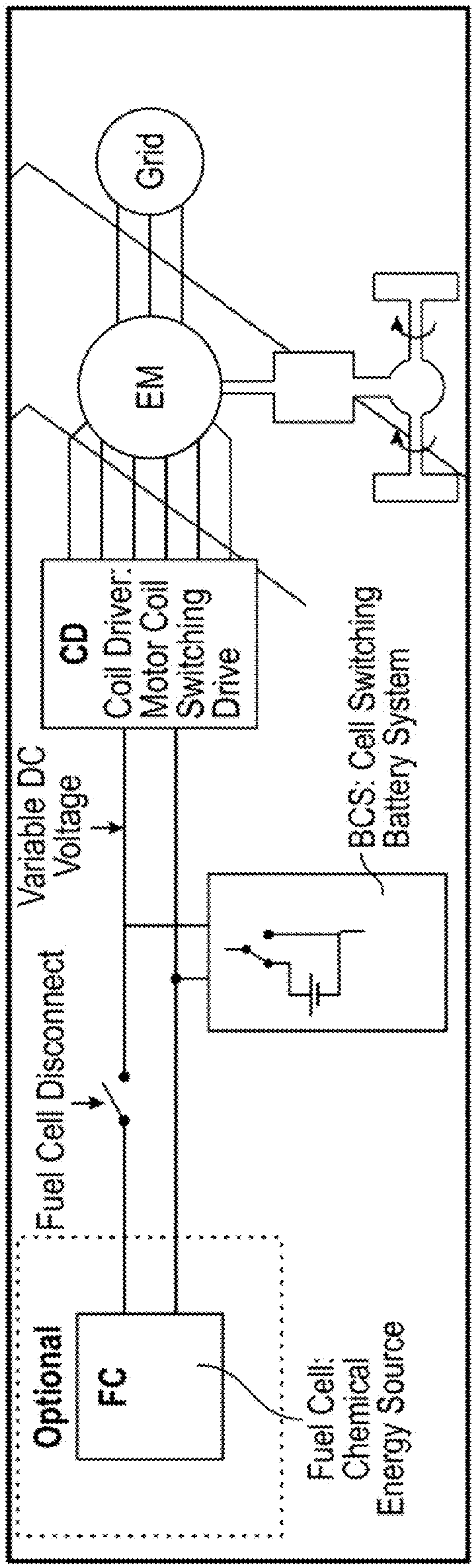
FIG. 2 is a graph showing a typical fuel cell performance curve.
Figure 3:
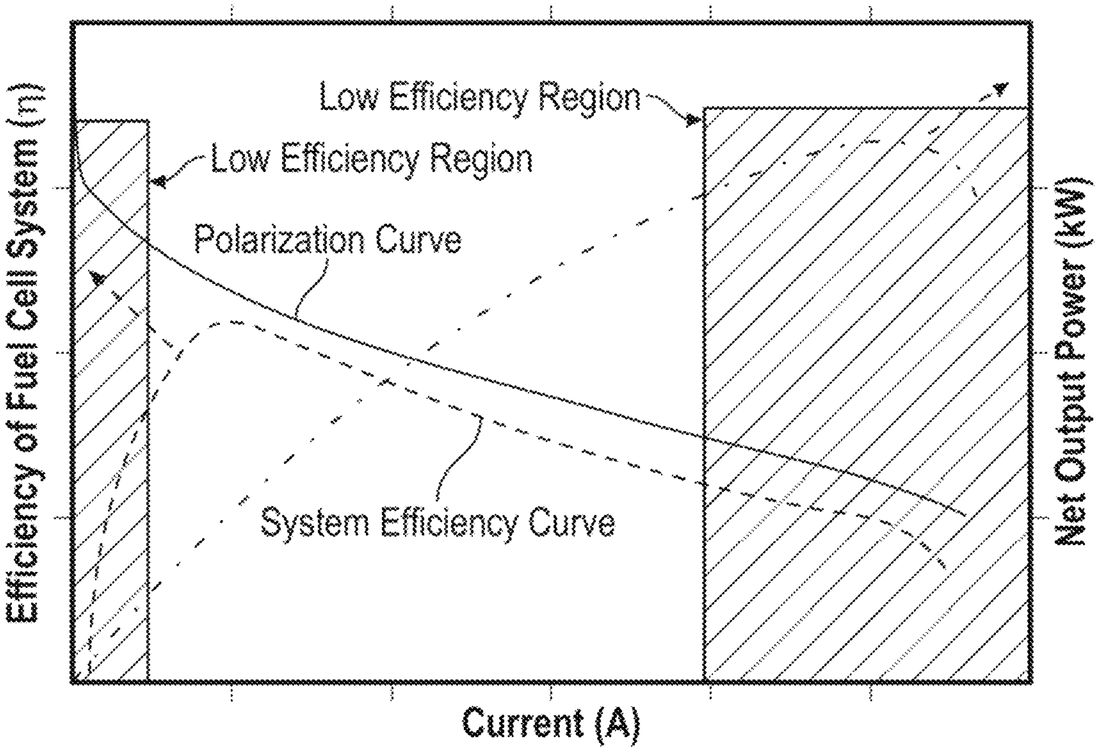
FIG. 3 is a schematic diagram of an electric vehicle including a power train that employs a coil driver system and a power source or cell control system (e.g., battery control system) in combination, according to at least one illustrated implementation.
Figure 4:
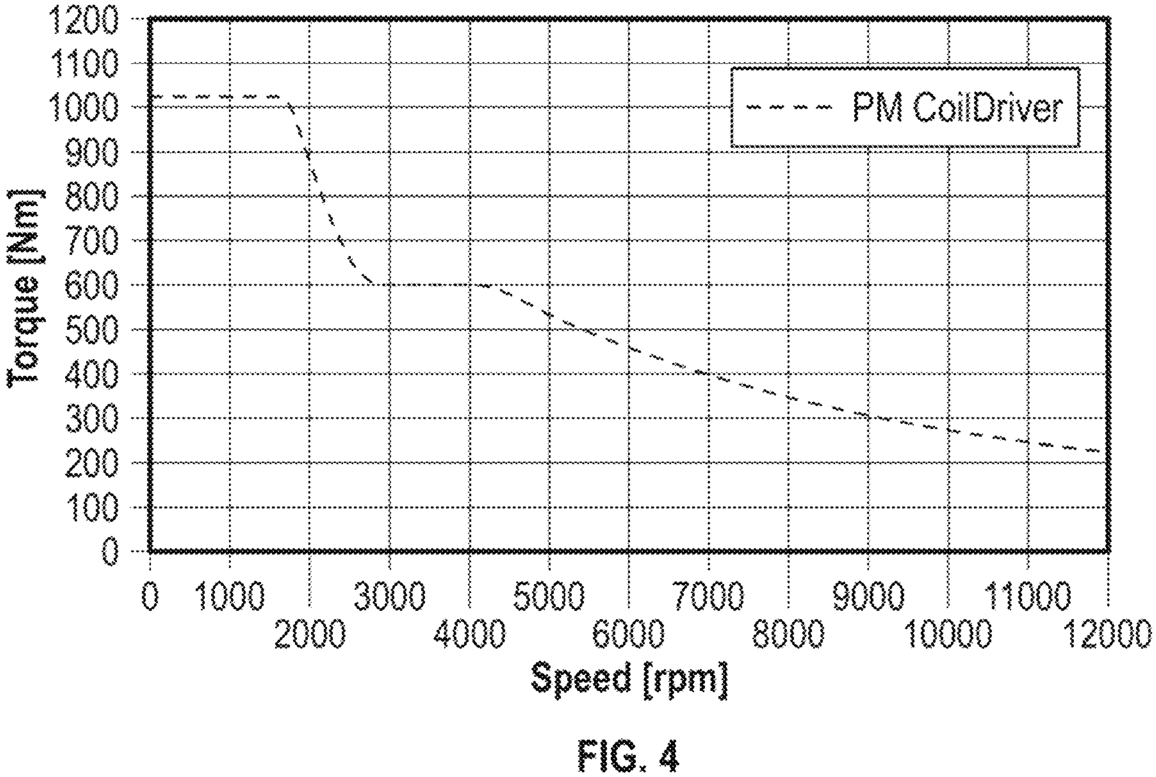
FIG. 4 is a graph showing a speed-torque profile generated by a coil driver system of an electric vehicle drive train in conjunction with an interior permanent magnet (IPM) machine, according to at least one illustrated implementation.
Figure 5:
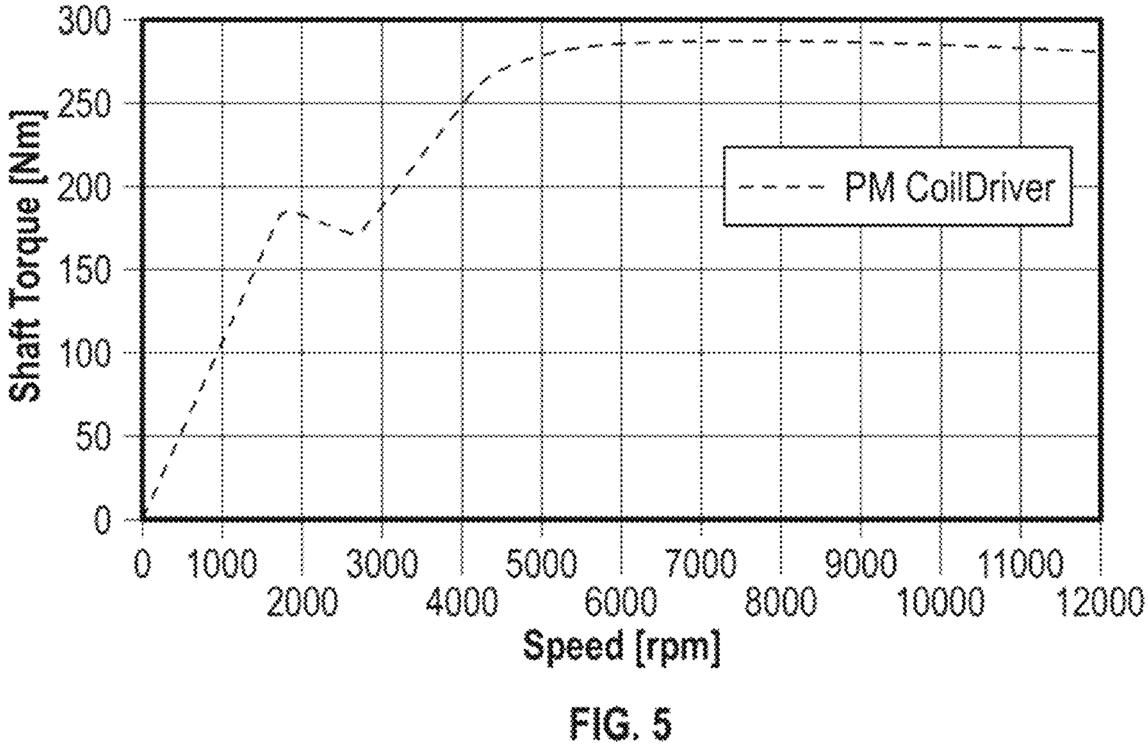
FIG. 5 is a graph showing a speed-power profile generated by a coil driver system of an electric vehicle drive train in conjunction with an IPM machine, according to at least one illustrated implementation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electric machines (e.g., generators, motors), control systems, and/or power conversion systems (e.g., converters, inverters, rectifiers) have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in this specification and the appended claims, the term "fuel cell" is interchangeably used to refer to a single fuel cell, or two or even more fuel cells, for example an array of fuel cells typically denominated as a fuel cell stack. The fuel cells can employ any of a large variety of fuel cell technologies, for instance fuels cells that employ a semipermeable membrane. Fuel cells can also employ a variety of fuels, for instance hydrogen or other fuels, and are generally operable to generate an electrical energy from a chemical reaction that "consumes" the fuel, and which may create a byproduct (e.g., water) in additional to electrical energy.

As used in this specification and the appended claims, the terms "battery" and "batteries" are used to refer to one or more cells of a battery, for example a secondary (i.e., rechargeable) battery for instance a secondary traction battery. As noted herein, batteries typically include a self-contained electrolyte, whereas fuel cells are typically supplied with an electrolyte from a reservoir or electrolyte source that, while often part of a fuel cell system, is external to the fuel cells themselves. Thus, a battery can be denominated as an energy storage while a fuel cell can be denominated as an energy generator or energy source.

As used in this specification and the appended claims, the terms "coil" and "coils" are used interchangeably with the terms "winding" and "windings" to refer to the electrically conductive member or members of an electric machine, typically wrapped around a pole, that provide magnetic flux when a current passes along the coil or in which a current flow is induced when subjected to a varying magnetic flux. The headings and Abstract of the Disclosure provided herein are for convenience only and do not interpret the scope or meaning of the embodiments.

This application generally relates to electrical vehicles and, more particularly, to powertrains for electric vehicles.

The powertrains can advantageously comprise a combination of two core technologies, a coil driver system and a power source or cell control system to demonstrate several system-level benefits.

The coil driver system is operable to perform coil configuration of a motor drive system. Such can, for example, advantageously provide two distinct torque curves, one for high speed operation, and one for low speed operation, allowing significant gains in efficiency and power at high speed while not sacrificing low-speed torque. In addition, the coil driver system can advantageously provide a grid tie inverter capability, with bidirectional power flow. Various implementations of coil driver systems and operation of the same are disclosed in US Pat. Publ. No. 20230011977A1 (420); US2021/0359523 (41101USPC); and International Pat. Publ. No. WO2018/213919 (408WO), which are each incorporated by reference herein in their entireties.

The power source or cell control system can, for example, include a battery control system (BCS). The BCS control architecture is operable to perform cell (e.g., battery cell) switching, implementing cell selection, active balancing, and/or variable DC link voltage. Various implementations of BCS control systems and operation of the same are disclosed in US Pat. Publ. No. 2022/0360091 A1 (415); and US 2022/0368135 (415C1); US2021/0359523 (41101USPC); and Battery Control for Hybrid Inverter Applications (in preparation 422), which are each incorporated by reference hereby in their entireties. The battery cell(s) store and supply electrical energy in the form of a DC voltage. Additionally or alternatively, in at least some implementations an electric vehicle power train can include one or more ultra- or super-capacitors, to store and supply electrical energy in the form of a DC voltage.

In at least some implementations, an electric vehicle power train can include one or more additional components. An electric vehicle power train can, for example, include one or more fuel cells (e.g., a fuel cell stack), or similar energy source to provide electrical power from a consumable fuel (e.g., hydrogen) and/or optionally convert electrical power into a consumable fuel. An electric vehicle power train can, for example, include one or more devices operable to convert chemical potential energy to electrical energy, for example with an output voltage characteristic similar to photovoltaic (PV) cells, resulting in a wide range of output voltages depending on output power.

Figure 6:
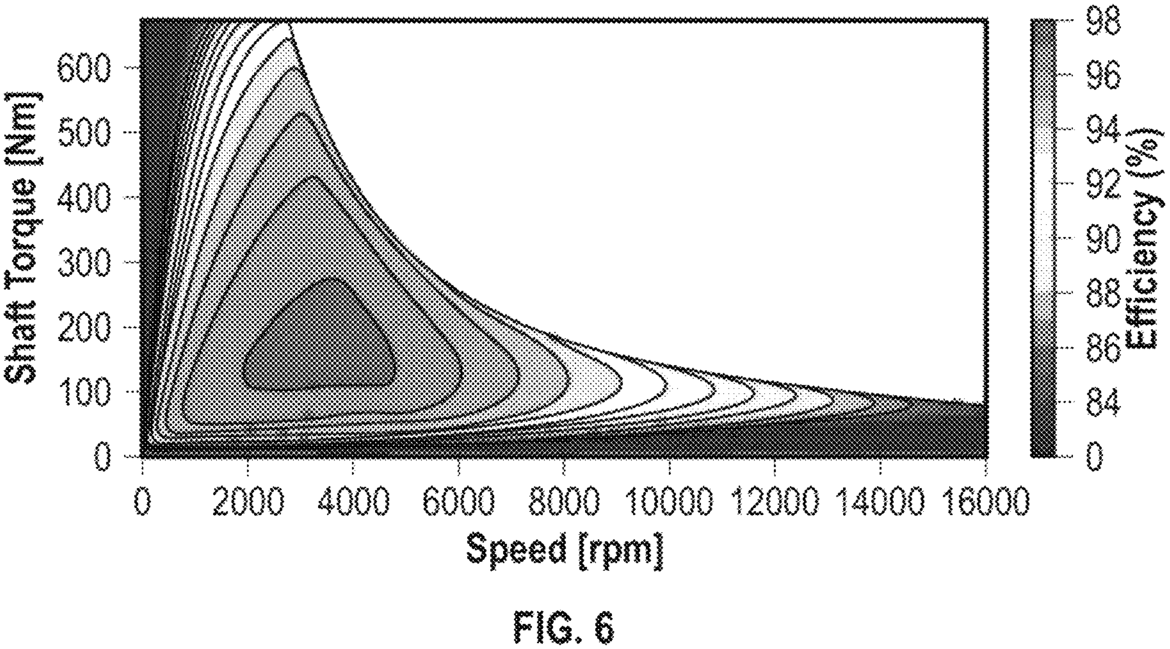
FIG. 6 is an efficiency map of an IPM electric machine with coils electrically coupled in series via a coil driver system of an electric vehicle drive train, according to at least one illustrated implementation.
Figure 7:
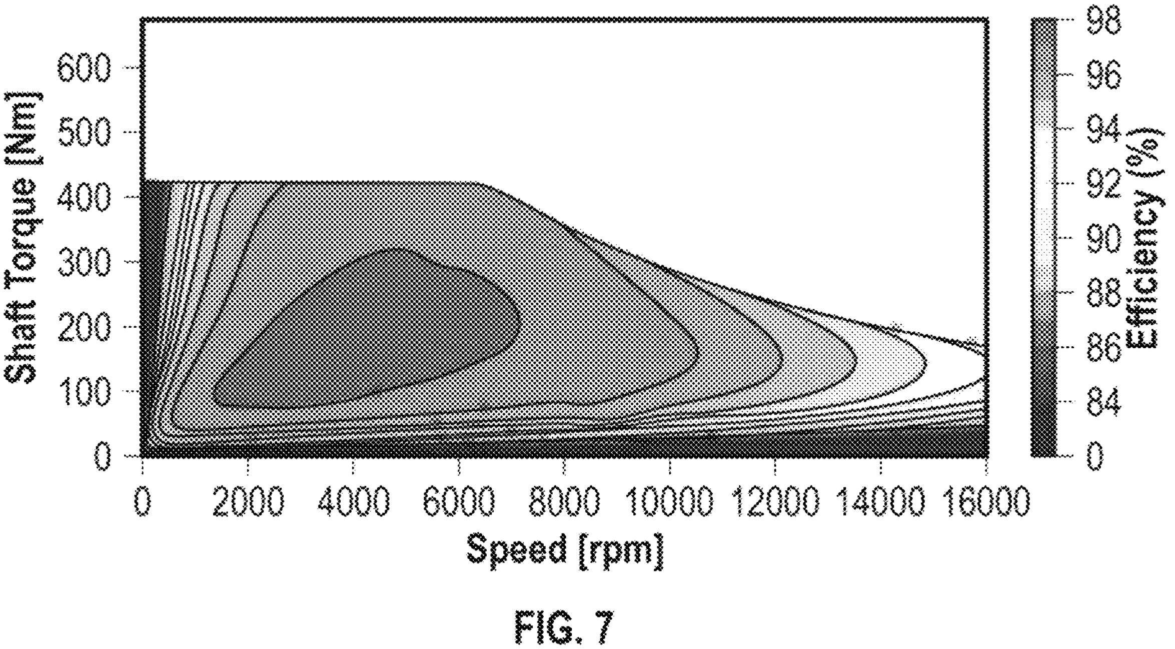
FIG. 7 is an efficiency map of an IPM electric machine with coils electrically coupled in parallel via a coil driver system of an electric vehicle drive train, according to at least one illustrated implementation.
Figure 8:
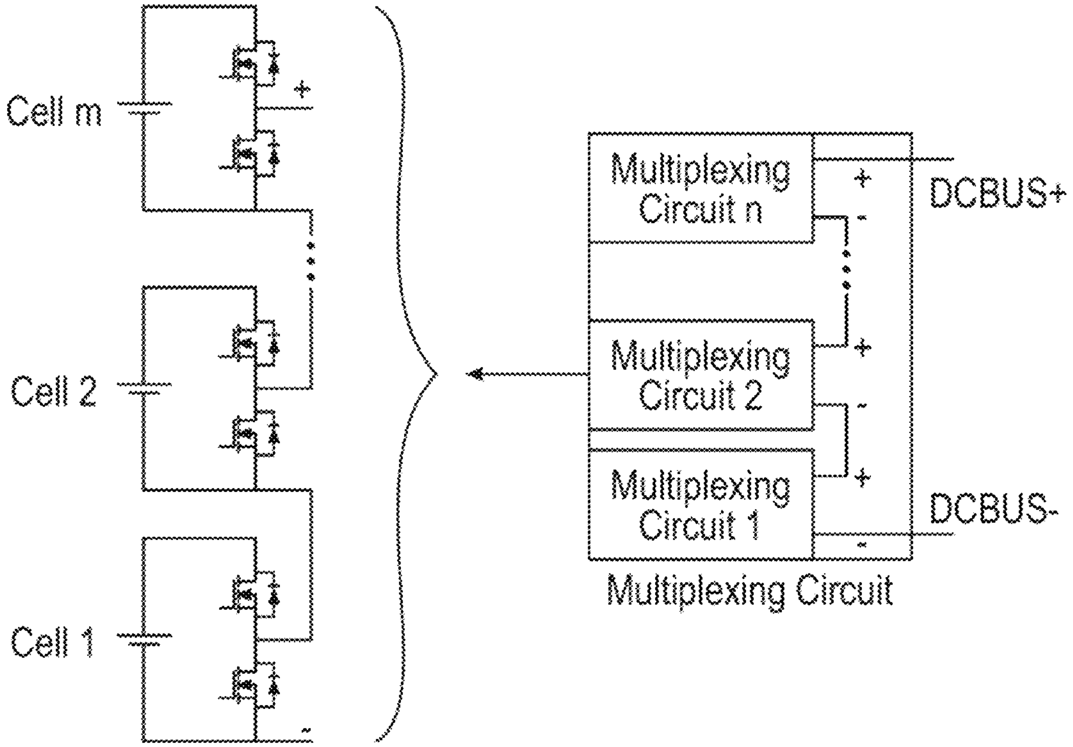
FIG. 8 is a schematic diagram showing a power source or cell control system (e.g., a battery control system (BCS)) of an electric vehicle drive train, according to at least one illustrated implementation, operable to perform cell multiplexing to switch cells (e.g., individual secondary battery cells of a traction battery) in and out to adjust an overall cell string voltage in steps of one (1) cell voltage.

The coil driver system implements coil switching of the coils or windings of an electric machine (e.g., electric motor/generator), with inherent bidirectional power conversion capability. The coil driver system can implement, for example, two torque profiles within one electric machine by switching stator packs between a series arrangement of coils or windings and a parallel arrangement of coils or windings (e.g., a 2:1 ratio of motor turns). Thus, the coil driver system can implement a series mode to produce a relatively high A-t (high torque) as well as a relatively high back electromotive force (BEMF) (low base speed). The same coil driver system can implement a parallel mode to produce a relatively low A-t (low torque) and a relatively low BEMF (high base speed). The two torque curves result in two distinct efficiency maps (e.g., FIGS. 6 and 7 for an interior permanent magnet (IPM) electrical machine), advantageously allowing more optimization options when developing electric vehicle drive systems.

The two torque profiles generated using series/parallel coil or winding switching allow motor architectures that otherwise tend to perform poorly in the high-speed area (above base speed) due to limitations in operation in the field weakening region, this results in poor Constant Power Speed Range (CPSR) performance and limits their utility to advantageously be utilized for wide-speed range applications (such as e-mobility). For example, induction motors, synchronous reluctance motors, and switched reluctance motors can all benefit significantly from coil or winding switching.

Charging:

The architecture of the coil driver allows the electric machine (e.g., motor) and drive system to act as a universal power converter, for example when an electric vehicle is not in motion (i.e., the motor is not turning). Utilizing the motor coils the system can connect to three (3) phase grid, single-phase, or DC sources (e.g., solar photovoltaic (PV)) to charge a battery of the electric vehicle.

The coil driver architecture is natively bidirectional so can also be used as a grid-connected ESS when the electric vehicle is not in use (e.g., depots, provide grid services, backup power, site power, etc.).

The power source or cell control system implements cell multiplexing, utilizing a hardware architecture that allows cells (e.g., secondary battery cells of a traction battery of an electric vehicle) to be switched in and out of an array or network of cells. Such advantageously allows adjustment of an overall cell string voltage, for example in increments of 1 cell voltage (e.g., ~3.3V if Li-ion battery chemistry is employed).

The electric vehicle power train is advantageously operable one several different operating modes and/or can provide several different capabilities, for example based on which operating mode is currently implemented.

As an example, the electric vehicle power train can provide a relative low (low) DC link voltage for low vehicle speed operations, thereby optimizing efficiency.

As another example, the electric vehicle power train can provide a variable DC link voltage, for instance to control operation when a fuel cell is present.

As yet another example, the electric vehicle power train can provide grid-connected charging, V2G, and/or a fuel cell power generator mode.

As yet a further example, the electric vehicle power train can provide cell fault handling, thereby providing operational redundancy.

As yet a further example, the electric vehicle power train can provide battery service options, for instance for heavy-duty operations. Such, can for example include cell replacement (e.g., service the cell pack). Such, can for example include module replacement, for instance replacing modules that are ready for a second life (ESS). Such, can for example include full pack replacement, for instance replacing modules that are ready for a second life (ESS).

As yet a further example, the electric vehicle power train can provide a implement a battery-less fuel cell-only operation, As an even further example, the electric vehicle power train can provide a predictive system. For instance, the electric vehicle an use one, two, more or even all system inputs (battery state of charge (SOC), vehicle state, etc.) and even consider additional inputs (e.g., location information or tracking information (GPS/route)) to configure the electric vehicle drive train for efficient operation.

As will be understood by those skilled in the relevant art(s), the operating modes described below would be controlled by processor-executable instructions (e.g., code) implementing the logic described herein and stored and located in nontransitory computer- or processor-readable media within the electric vehicle (e.g., as firmware/software/hardware on a VCS, the VCU, the inverter or any other module on within the greater electric vehicle platform).

A number of illustrative operational scenarios are discussed below, with reference to various ones of the figures.

Operation Scenario 1: Low Speed

Figure 9:
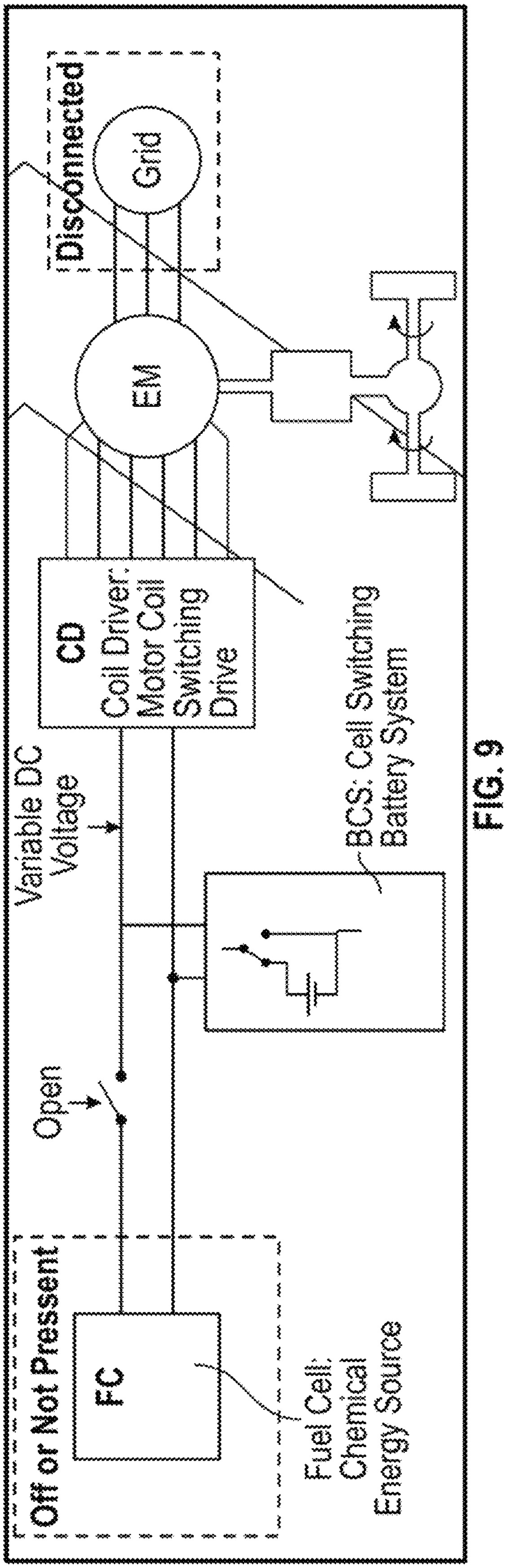
FIG. 9 is a schematic diagram of an electric vehicle optionally electrically coupled to an electrical grid, the electric vehicle including a coil driver system, a power source or cell control system (e.g., BCS) in combination with the coil driver system, and optionally a fuel cell system, with a variable voltage DC bus implementing a low speed operational scenario or mode, according to at least one illustrated implementation.
Figure 10:
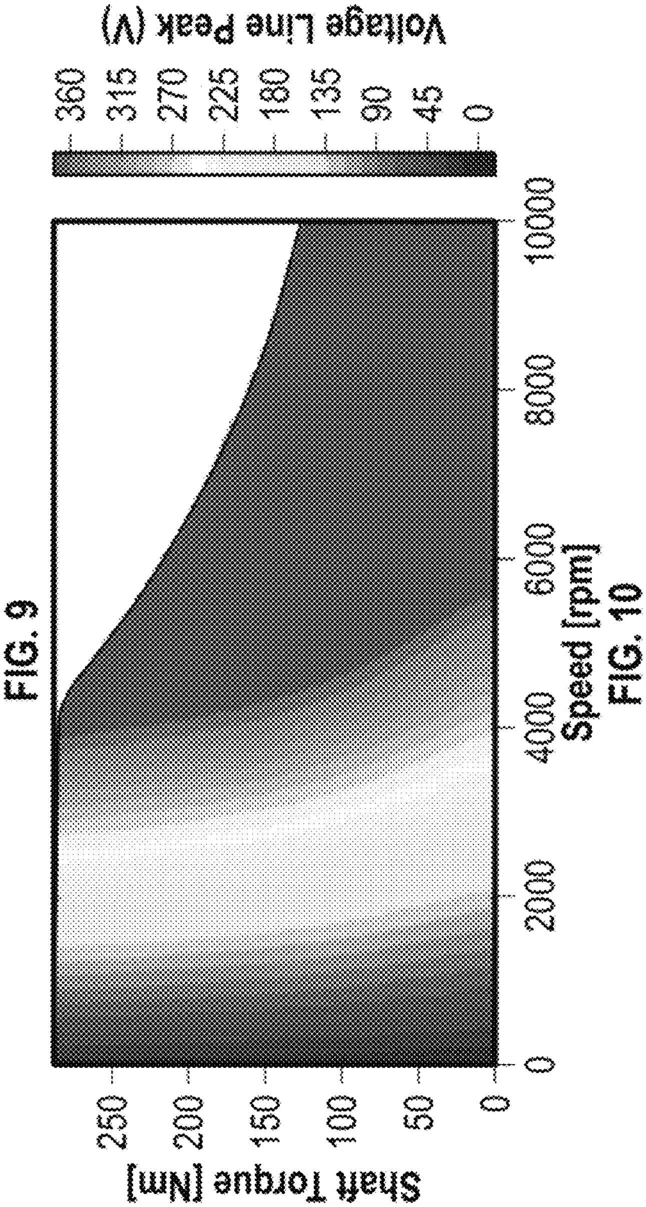
FIG. 10 is an efficiency map showing motor a plot of terminal voltage versus speed of an electric machine of an electric vehicle in a low speed operational scenario or mode, according to at least one illustrated implementation.

The low speed operational scenario or mode is discussed with reference to FIGS. 9 and 10. In particular, FIG. 9 shows an electric vehicle optionally electrically coupled to an electrical grid, the electric vehicle including a coil driver system, a cell switching system in combination with the coil driver system, and optionally a fuel cell system, with a variable voltage DC bus implementing a low speed operational scenario or mode, according to at least one implementation. FIG. 10 shows an efficiency map showing motor terminal voltage versus speed of an electric machine in a low speed operational scenario or mode, according to at least one implementation.

The low speed operational scenario or mode can advantageously be used at low speed, that is when the electric vehicle is at or below a base speed (e.g., a speed and torque below the solid red area in the image to the right). The low speed operational scenario or mode can advantageously be used for all torques.

Where the electric vehicle drive train includes fuel cell system, the low speed operational scenario or mode can advantageously be used when the SOC of the battery/batteries has/have a sufficient margin to support operation.

Notably, if the drive system is operating in an area other than the solid red (FIG. 10), there is an opportunity to reduce the DC link voltage, which can advantageously reduce system losses using the battery cell system to switch the electrical connections between battery cells to obtain a specified or desire voltage across the DC link.

The low speed operational scenario or mode can advantageously effect inverter switching losses→reduced proportionally to voltage reduction. The low speed operational scenario or mode can advantageously effect electric machine (e.g., motor) hysteresis losses, which can be reduced proportionally to reduced PWM ripple current. The low speed operational scenario or mode can advantageously effect the battery system: For example, the drive train can advantageously vary a DC link voltage according to a torque request and/or a speed request. Such can advantageously result in benefits including: cell resting and cell balancing.

Operation Scenario 2: Fuel Cell Management

Figure 11:
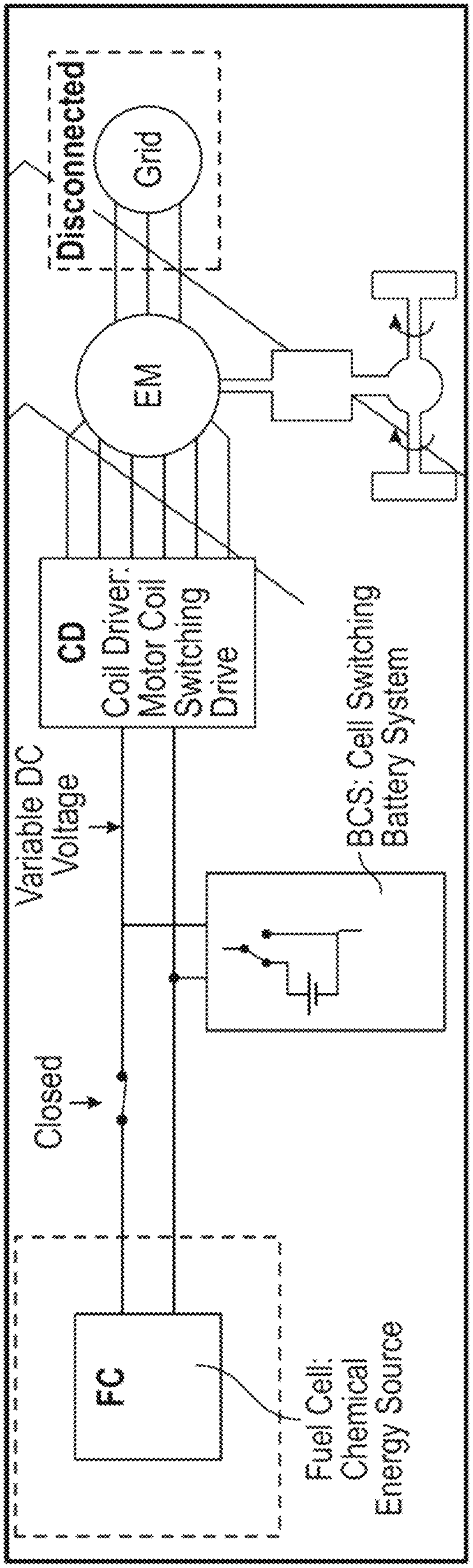
FIG. 11 is a schematic diagram of an electric vehicle optionally electrically coupled to an electrical grid, the electric vehicle including a coil driver system, a power source or cell control system (e.g., BCS) in combination with the coil driver system, and optionally a fuel cell system, with a variable voltage DC bus implementing a fuel cell management operational scenario or mode, according to at least one illustrated implementation.
Figure 12:
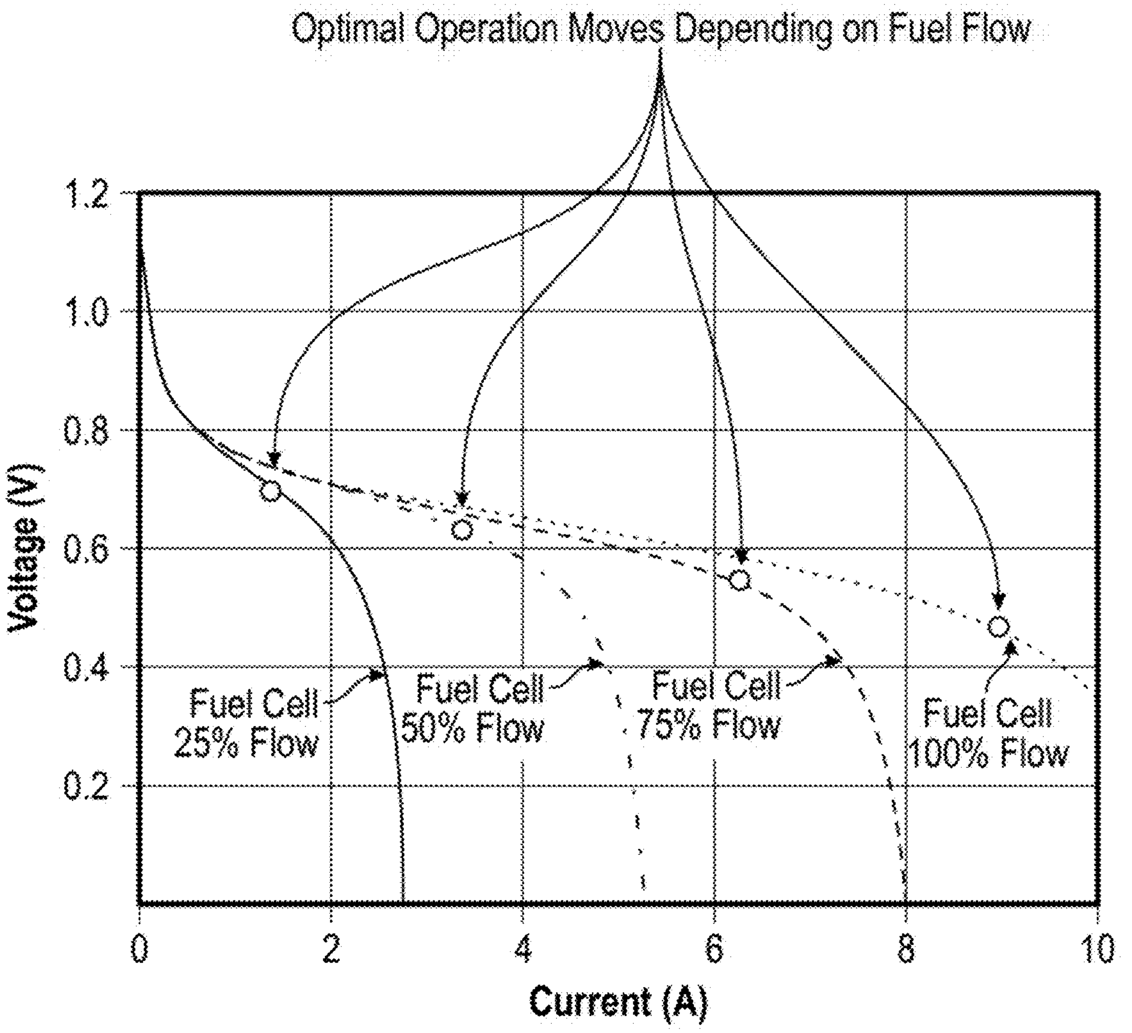
FIG. 12 is a graph showing efficiency curves for an exemplary fuel cell stack of an electric vehicle drive train in the fuel cell management operational scenario or mode and implement of a maximum power point tracking (MPPT) operation, according to at least one illustrated implementation.

The fuel cell management operational scenario or mode is discussed with reference to FIGS. 11 and 12. In particular, FIG. 11 shows an electric vehicle optionally electrically coupled to an electrical grid, the electric vehicle including a coil driver system, a cell switching system in combination with the coil driver system, and optionally a fuel cell system, with a variable voltage DC bus implementing a fuel cell management operational scenario or mode, according to at least one implementation. FIG. 12 shows an efficiency map showing motor terminal voltage versus speed of an electric machine in the fuel cell management operational scenario or mode, according to at least one implementation.

The fuel cell management operational scenario or mode can advantageously be used at all speeds and torques where a fuel cell system is present.

The fuel cell management operational scenario or mode can advantageously be used when the electric vehicle determines i) that the SOC of the battery/batteries is relatively low (does not has/have a sufficient margin to support operation); and/or ii) a vehicle power demand exceeds battery capability. In response to such a determination, the drive train is configured such that the fuel cell(s) deliver power via the DC link. Thus, the fuel cell system can be used to charge the batteries and/or provide additional DC power above what the batteries can provide.

In particular, the electric vehicle (e.g., the drive train of the electric vehicle) can control the DC link voltage to manage fuel cell system output. The cell control system (e.g., BSC) can manage the battery (e.g., traction battery) at the individual cell level (e.g., for balance, resting, and managing the pack, while delivering or absorbing the specified or required current.).

In the fuel cell management operational scenario or mode the coil driver selects and/or implements a coil or winding configuration (e.g., series; parallel) to maintain a desired output torque.

If DC link voltage needs are higher than the optimal charging operating point, then the system decides which has priority. Typically, vehicle requirement would take priority until a certain minimal SOC of the battery is reached, then the battery charging would take priority.

In the fuel cell management operational scenario or mode the system or a component thereof (e.g., processor) can execute one or more predictive system algorithms. Such can, for example, anticipate a route and/or conditions on the route. For example, a processor can employ a route entered by a user or supplied via a route planning or mapping system (e.g., Google® maps, Wayze®, Apple® maps). Also for example, a processor can rely on position information from a positioning receiver that receives satellite communications instance relying on Global Position System (GPS) information. The processor can, for example, determine required energy, for instance to climb one or more hills on the route. This processor can track and/or use a representation of power consumed over by the electric vehicle over one or more previous legs of a trip or previous trips to estimate a weight of the electric vehicle with passengers and other cargo. The processor can, for example, predict based at least in part on the estimated weight the SOC, fuel cell output, etc. that will be consumed in transiting the route or portion thereof (e.g., to get the system ready to climb a hill. In another example, the processor can ensure the battery has sufficient SOC for an anticipated low-speed area, allowing the electric vehicle drive train to decouple and/or shut down the fuel cell system, and enter a mode that runs on a low DC link voltage (i.e., change to low speed Scenario 1, discussed above)

Fuel Cell Operation:

Fuel cell operation can be categorized into two broad categories, i) operating as a battery charger where the fuel cell system operates at substantially less than its maximum power (e.g., approximately 20-30% power) but at or proximate a maximum efficiency and the battery supplies the transient power, or ii) the fuel cell system operating at or proximate its maximum power to supplement the battery. This changes the ratio of fuel cell power to battery capacity.

Thus, in one mode the fuel cell system provides energy support and maximum efficiency charging. In this mode, the fuel cell system maintains the fuel cell at or proximate its most efficient operating point (e.g., relatively high DC link voltage).

In the other mode, the fuel cell system provides power support. This mode maintains the fuel cell at its maximum power operating point (e.g., relatively lower DC link voltage, which can for instance be as low as 40-50% of DC link nominal voltage). In this mode the coil driver transitions to being parallel mode dominated, due to the relatively low DC link voltage, in order to maintain vehicle performance. The battery SOC determines if the vehicle speed torque demand overrides the fuel cell's maximum power operating point. That is, the lower DC link voltage will at some point collide with the minimum voltage required to meet a speed/torque point as speed rises. During those events, the electric vehicle drive train would increase the DC link voltage, reducing fuel cell output but increasing its efficiency.

Fuel Cell System Operation:

Fuel cell system operation can advantageously implement maximum power point tracking (MPPT) operation, for example if the fuel cell system is operating in constant fuel flow mode. FIG. 12 shows current voltage plots for an exemplary fuel cell system representing MPPT operation.

The predictive operation, anticipate charging power and energy, set the fuel cell to appropriate constant fuel flow, control the fuel cell to the desired operating point, charge and maintain batteries, and/or deliver power to load.

Operation Scenario 3: V2X-Charging

Figure 13:
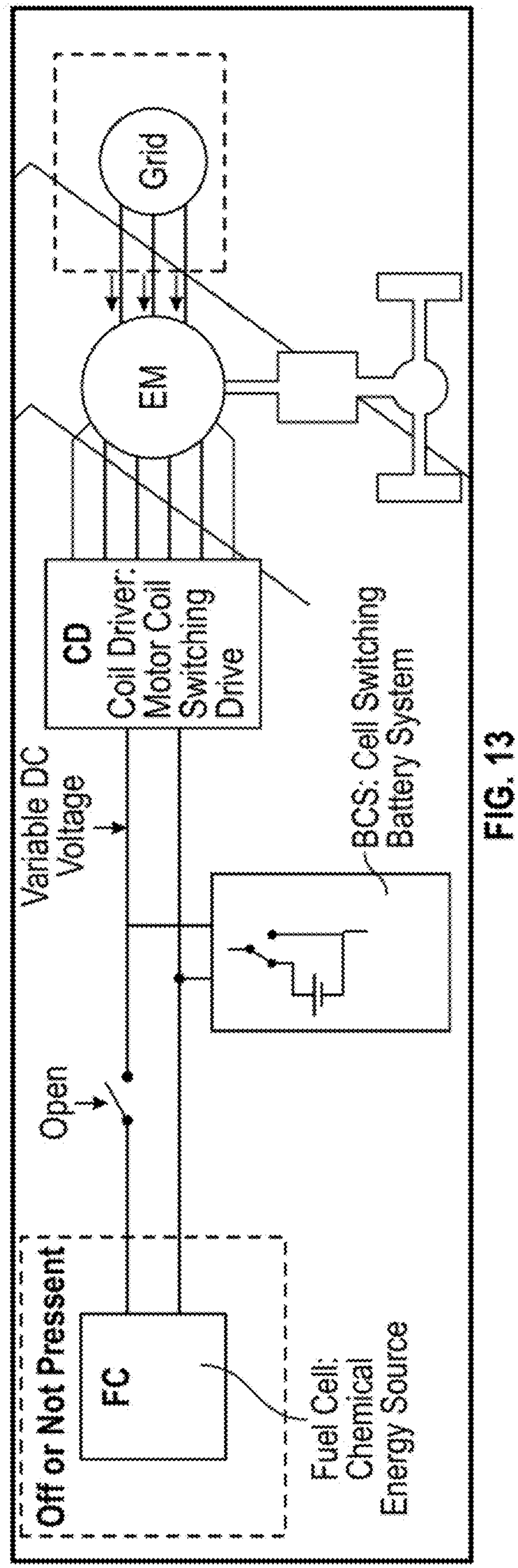
FIG. 13 is a schematic diagram of an electric vehicle electrically coupled to an electrical grid, the electric vehicle including a coil driver system, a power source or cell control system (e.g., BCS) in combination with the coil driver system, and optionally a fuel cell system, with a variable voltage DC bus, according to at least one illustrated implementation.

The V2X charging case operational scenario or mode is discussed with reference to FIG. 13. In particular, FIG. 13 shows an electric vehicle electrically coupled to an electrical grid, the electric vehicle including a coil driver system, a cell switching system in combination with the coil driver system, and optionally a fuel cell system, with a variable voltage DC bus implementing a V2X charging operational scenario or mode, according to at least one implementation. The V2X charging case operational scenario or mode implements grid-tied electric vehicle charging of the battery/batteries (e.g., cells of a traction battery of an electric vehicle).

The V2X charging operational scenario or mode operational scenario or mode can advantageously be used when the electric vehicle is stationary, and no torque is being produced by the electric machine (e.g., electric motor).

Where a fuel cell system is present this grid-tied charging could be used, for example to save fuel (e.g., hydrogen).

In the V2X charging operational scenario or mode the coil driver system operates a grid-tied charging mode (e.g., single phase or 3 phase). The coil driver system in this operational scenario or modes acts as a constant power source (e.g., variable output voltage and current), while the cell control system (e.g., BCS) varies several cells to be charged based on the SOC and SOH of the cells. As the battery approaches 100% SOC, the coil driver system delivers less power, for example in response to commands from the BCS or other processor-based system.

The V2X charging operational scenario or mode is somewhat similar to the normal coil driver charging mode, although in this mode the cell control system (e.g., BCS) manages SOC on a cell level.

Operation Scenario 3: V2x-Charging (Special Case)

Figure 14:
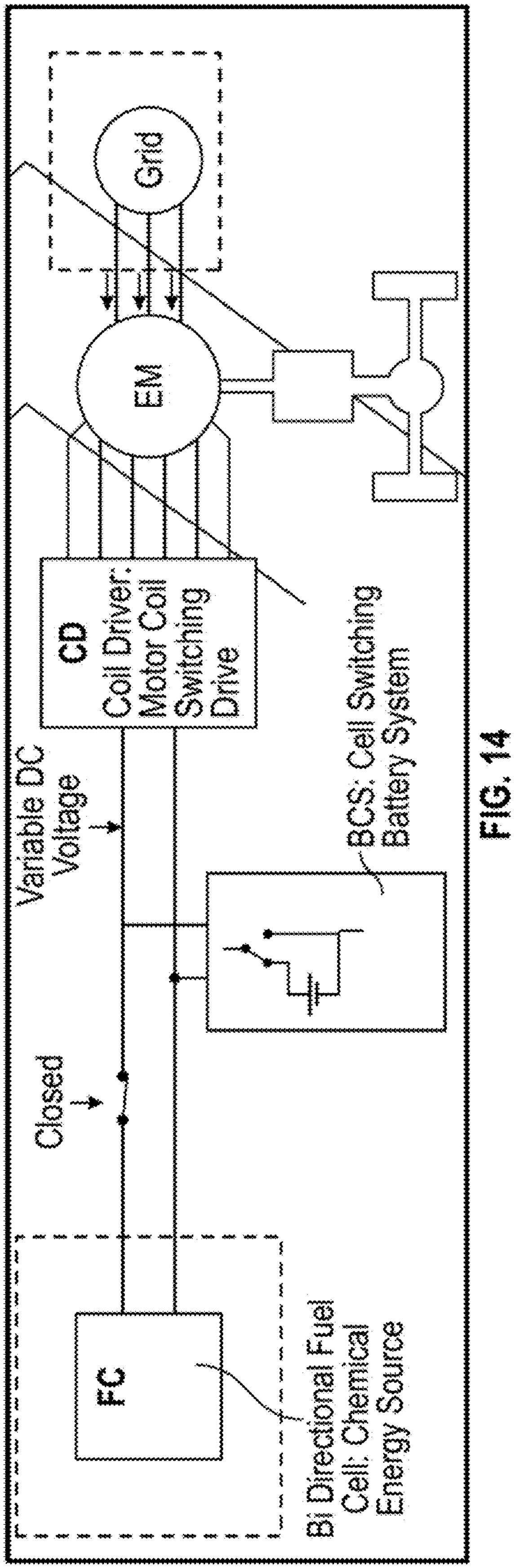
FIG. 14 is a schematic diagram of an electric vehicle electrically coupled to an electrical grid, the electric vehicle including a coil driver system, a power source or cell control system (e.g., BCS) in combination with the coil driver system, and optionally a fuel cell system, with a variable voltage DC bus, according to at least one illustrated implementation.

The V2X charging special case operational scenario or mode is discussed with reference to FIG. 14. In particular, FIG. 14 shows an electric vehicle electrically coupled to an electrical grid, the electric vehicle including a coil driver system, a cell switching system in combination with the coil driver system, and a fuel cell system, with a variable voltage DC bus implementing a V2X charging special case operational scenario or mode, according to at least one implementation. The V2X charging special case operational scenario or mode implements grid-tied electric vehicle charging of the battery/batteries (e.g., cells of a traction battery of an electric vehicle).

The V2X charging special case operational scenario or mode operational scenario or mode can advantageously be used when the electric vehicle is stationary, and no torque is being produced by the electric machine (e.g., electric motor).

Where a fuel cell system is present this grid-tied charging could be used, for example to save fuel (e.g., hydrogen) or even generate fuel where the electric vehicle drive train includes a bi-directional fuel system.

In this case a "bi-directional fuel cell" take any number of forms for example including zinc-air flow batteries. Essentially any system that can regenerate "fuel" from its by-product can be employed. This could be powered by any reversible electrolytic redox reaction. In some implementations a battery can comprise a Li ion cell, for instance implemented as single self-contained cells (e.g. ~3.2V). In some implementations fuel cells are typically constructed as many cells in a series as a fuel cell stack, typically generating much higher voltages than the individual battery cells. Fuel cells typically have an external supply of electrolytes, while batteries typically have self-contained electrolytes.

In the V2X special case charging operational scenario or mode, the coil driver system operates in a grid-tied charging mode (e.g., single phase or 3 phase). The coil driver system in this operational scenario or modes acts as a constant power source (e.g., variable output voltage and current), while the cell control system (e.g., BCS) varies several cells to be charged based on the SOC and SOH of the cells. As the battery approaches 100% SOC, the coil driver system engages the bi-directional fuel cell system, and the coil driver system is delivering constant power. The coil driver system can, for example be responsive to commands from the BCS or other processor-based system. In such an implementation, the BCS is controlling battery to zero amps (e.g., all power is flowing to the fuel cell system, and the fuel cell system FC generates fuel).

The V2X special case charging operational scenario or mode allows the fuel tanks to be refilled by an external grid or other electrical energy source.

Figure 15:
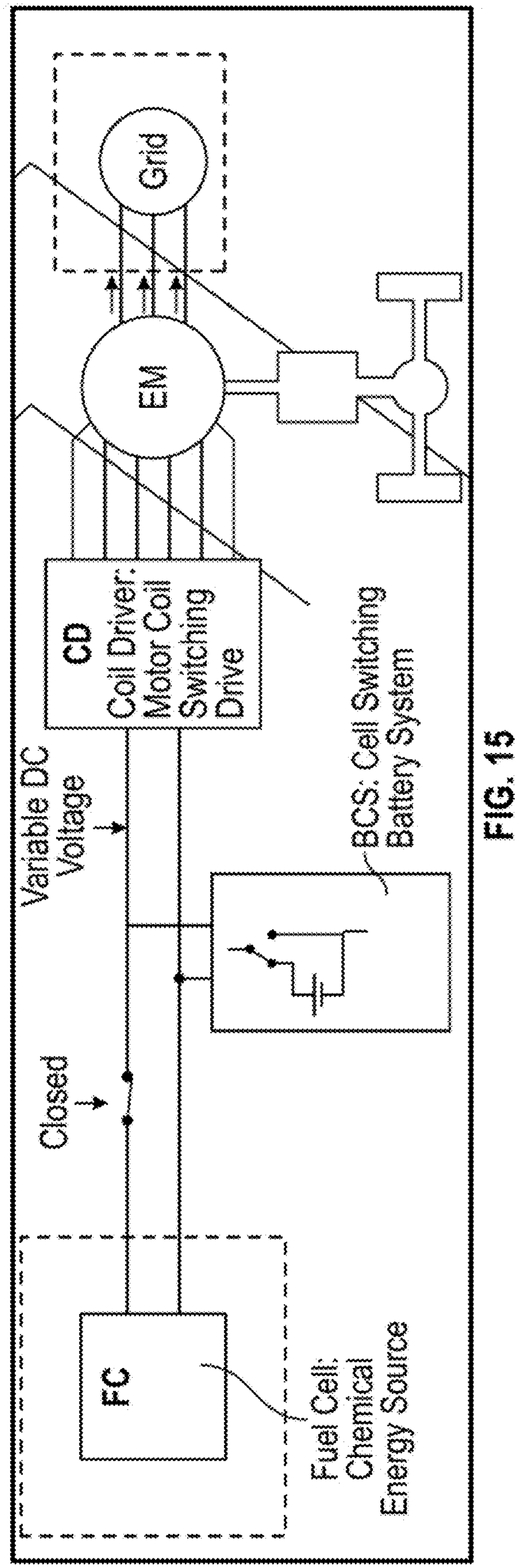
FIG. 15 is a schematic diagram of an electric vehicle optionally electrically coupled to an electrical grid, the electric vehicle including a coil driver system, a power source or cell control system (e.g., BCS) in combination with the coil driver system, and optionally a fuel cell system, with a variable voltage DC bus, according to at least one illustrated implementation.

Operation Scenario 3: V2X-Discharging (FIG. 15)

The V2X discharging operational scenario or mode is discussed with reference to FIG. 15. In particular, FIG. 15 shows an electric vehicle electrically coupled to an electrical grid, the electric vehicle including a coil driver system, a cell switching system in combination with the coil driver system, and a fuel cell system, with a variable voltage DC bus implementing a V2X discharging operational scenario or mode, according to at least one implementation. The V2X discharging operational scenario or mode implements grid-tied electric vehicle charging of the battery/batteries (e.g., cells of a traction battery of an electric vehicle).

The V2X discharging operational scenario or mode operational scenario or mode can advantageously be used when the electric vehicle is stationary, and no torque is being produced by the electric machine (e.g., electric motor).

Where a fuel cell system is present this grid-tied discharging could be used to allow the electric vehicle to act as a generator as long as there is a supply of fuel to the fuel cell system.

In the V2X special case charging operational scenario or mode, the coil driver system operates in a grid-tied discharging mode (e.g., single phase or 3 phase). The coil driver system in this operational scenario or mode causes the electric vehicle drive train to deliver electrical power to the grid and/or to islanded loads (e.g., remote site power, military base power). Thus, with the fuel cell system present and operable, the electric vehicle advantageously is operable as a generator that can provide power as long as the fuel cell system can be refueled.

If no fuel cell system is present or operable (e.g., lack of fuel), the coil driver system can operate the drive train of the electric vehicle as an energy storage system when not in use. This operation would be similar in at least some respects to battery energy storage systems, peak shaving, solar storage, etc.

Operation Scenario 4: Battery Cell Redundancy/Fault Handling

Figure 16:
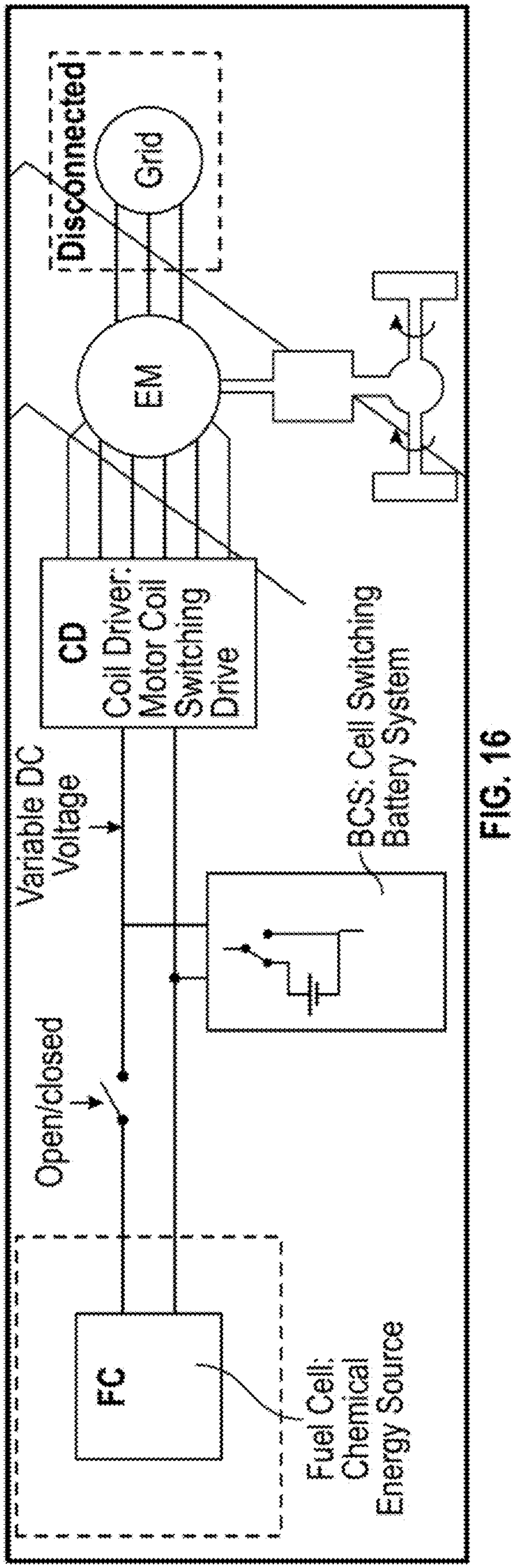
FIG. 16 is a schematic diagram of an electric vehicle optionally electrically coupled to an electrical grid, the electric vehicle including a coil driver system, a power source or cell control system (e.g., BCS) in combination with the coil driver system, and optionally a fuel cell system, with a variable voltage DC bus, according to at least one illustrated implementation.

The battery cell redundancy/fault handling operational scenario or mode is discussed with reference to FIG. 16. In particular, FIG. 16 shows an electric vehicle optionally electrically coupled to an electrical grid, the electric vehicle including a coil driver system, a cell switching system in combination with the coil driver system, and optionally a fuel cell system, with a variable voltage DC bus implementing a battery cell redundancy/fault handling operational scenario or mode, according to at least one implementation.

The battery cell redundancy/fault handling operational scenario or mode can advantageously be used at all speeds and torques.

The electric vehicle drive train optionally includes fuel cell system.

In the battery cell redundancy/fault handling operational scenario or mode, the cell control system (e.g., BCS) offers redundancy. For example, if a cell is completely depleted, or is damaged, or at risk of thermal runaway, the cell control system can stop using that particular cell while allowing the electric vehicle to continue operating. For example, the cell control system can operate switches to electrically decouple one or more depleted, damaged, or compromised battery cells out of a string of battery cells. Also for example, the cell control system can operate switches to electrically couple one or more charged, undamaged, or uncompromised battery cells into a string of battery cells, for example to replace the uncoupled battery cells.

Operation Scenario 5: Battery Service Options for Heavy-Duty Applications

The battery service options for heavy-duty applications operational scenario or mode can be implemented in an electric vehicle with a drive train similar or even identical to that illustrated in FIG. 16.

The battery service options for heavy-duty applications operational scenario or mode can advantageously be used at all speeds and torques.

The electric vehicle drive train optionally includes fuel cell system.

The capability of the cell control system (e.g., BCS) to stop operating bad cells and manage cells of different capacities or states of health advantageously offers several options for large battery banks from a service perspective.

If the cell control system (e.g., BCS) detects a faulty cell or module, the cell control system (e.g., BCS) can cease operation of that cell or module while allowing the electric vehicle to continue operating, either normally if there is the excess capacity, or in a "limp" home mode to get the vehicle as close to home as efficiently as possible (in this case optimizing the number of cells used and limiting system operation point to avoid low-efficiency regions in an active and predictive manner).

Since the cell control system (e.g., BCS) is actively controlling and monitoring each cell for its SOH, the cell control system (e.g., BCS) can recommend cells or modules for replacement as they wear out. For example, the cell control system (e.g., BCS) can issue alerts or notifications in real-time, or otherwise flag cells or modules for servicing or replacement at the next servicing of the electric vehicle, at which time the flagged cells or modules can be replaced with new parts. Depending on the state of the cells or modules these would then either be recycled or put into stationary energy storage systems.

This native ability of the cell control system (e.g., BCS) to manage and effectively operate a pack of cells with different capacities allows brand-new cells to be introduced to the system with no detrimental impact.

Figure 17:
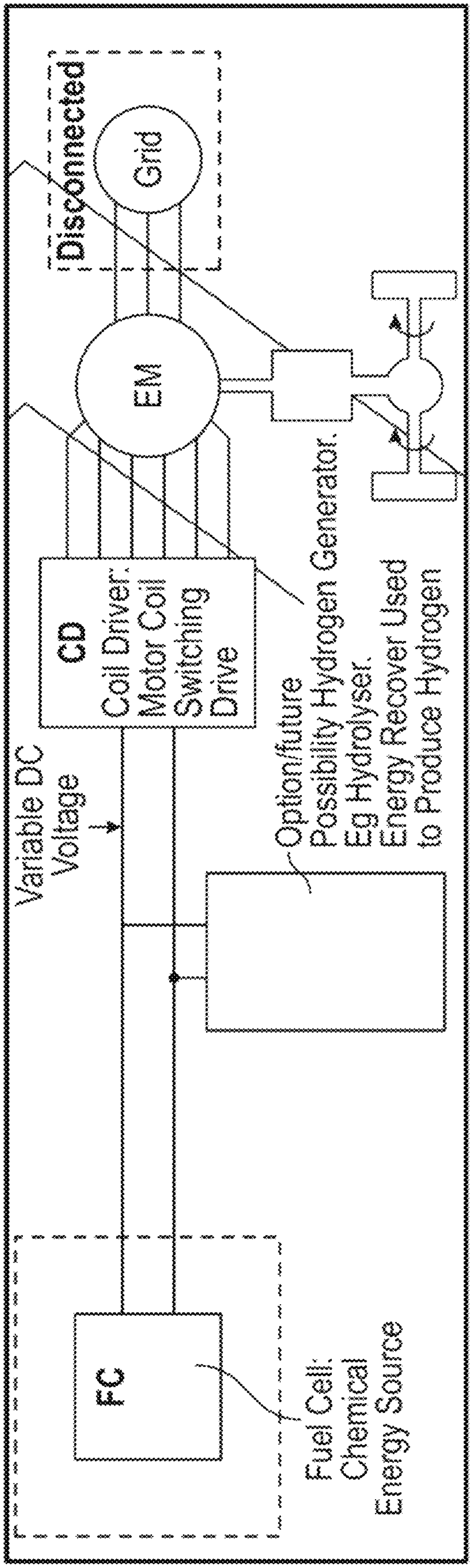
FIG. 17 is a schematic diagram of an electric vehicle optionally electrically coupled to an electrical grid, the electric vehicle including a power train that employs an electric machine, a coil driver system and a fuel cell system while omitting battery cells, an optional fuel generator system, with a variable voltage DC bus, according to at least one illustrated implementation.

Operation Scenario 6: Battery-Less Fuel Cell System (FIG. 17)

The battery-less fuel cell system operational scenario or mode is discussed with reference to FIG. 17. In particular, FIG. 17 shows an electric vehicle optionally electrically coupled to an electrical grid, the electric vehicle including a coil driver system, a fuel cell system in combination with the coil driver system, and optionally a fuel (e.g., hydrogen) generator system, with a variable voltage DC bus implementing a battery-less fuel cell system operational scenario or mode, according to at least one implementation.

The battery-less fuel cell system operational scenario or mode can advantageously be used at all speeds and torques.

The electric vehicle drive train omits a central energy storage (e.g., traction battery/traction battery cells). The electric vehicle drive train optionally includes fuel generation system, operation to produce fuel, for example, to produce hydrogen.

In the battery cell redundancy/fault handling operational scenario or mode, the cell control system (e.g., BCS) offers redundancy.

Potential applications for the battery-less fuel cell system operational scenario or mode include any large mechanical energy consumers with minimal or no possibility for regeneration. Some examples of such can include: ships, excavators, trains, etc.

Since the output voltage of the fuel cell system reduces with increasing output power, the coil driver system is advantageously used to allow the electric machine (e.g., electric motor) to still effectively operate over a wide speed-torque range with the reducing DC voltage.

The electric vehicle drive train can include bi-directional fuel cells (i.e., fuel cells that can also consume electric power and produce fuel, for instance producing H2) Alternatively or additionally, the, electric vehicle drive train can include a separate fuel (e.g., H2) production or generation system, for example, a hydrolyzer, could be used as an absorber.

Where regenerative braking is to be provided but rarely used, a simple brake resistor can be employed.

Operation Scenario 7: Adaptive/Predictive System

Use route, GPS as well as vehicle state to optimize for range (e.g., cruise control), modifying all available BCS and coil driver system variables to optimal use of available resources to achieve route goals or maximize range and ability to overcome upcoming obstacles (e.g., hills).

The adaptive and/or predictive system can, for example, be employed with any one or more of 1) low speed operational scenario or mode; 2) fuel cell management operational scenario or mode; and/or 6) battery-less fuel cell system operational scenario or mode.

The coil driver system utilizes an electric machine M in various ways, based on the operational mode or configuration of coil driver system. In one type of operational mode or configuration, coil driver system is operative as a driver of electric machine. In other operational modes or configurations, system utilizes the windings of electric machine as inductors in power-converter circuitry.

Electric machine may be a poly-phase electrical machine, for example, a non-commutated (AC) machine, such as an induction motor, synchronous motor (e.g., permanent-magnet or field-excited rotor), or brushless DC motor, or electrical generator, with sufficiently constructed windings to withstand the operating voltages and currents as may be required by operation of the power-converter circuitry.

The coil driver system includes controller, switching circuitry, and electrical probes. In various applications, as described in greater detail below, coil driver system may be electrically coupled to DC power storage device(s). The one or more DC power storage devices can take a variety of forms, for example traction motor secondary battery cells of an electric vehicle, other secondary battery cells, super- or ultra-capacitor cells. Additionally or alternatively, the coil driver system may be electrically coupled to a fuel cell system, for instance regenerative fuel cells where hydrogen can be generated and stored. DC power storage device(s) and/or the fuel cell system may be used to supply power to, and recover power from, electric machine when electric machine is used as a motor in 4-quadrant operation that includes regenerative braking.

Switching circuitry, operating under the control of controller, may produce variable-frequency drive power to electric machine, and may rectify and convert power generated by electric machine to a DC voltage to recharge DC power storage device(s). Switching circuitry includes a plurality of controlled switches (for example semiconductors) which may be electronically arranged by controller to provide motor-drive functionality, rectification functionality, inversion functionality, voltage boost-functionality, and voltage-reduction functionality. Notably, certain individual switches may be configured to perform different ones of these functions at different times. Switching circuitry may also include supporting circuitry, such as gate-driving circuits, snubbing circuits, filters, protection components, controller-interface circuitry, and the like.

In addition, coil driver system may be operatively coupled to one or more additional sources of power, such as an AC power grid, DC supply (e.g., fuel cell, or other DC source). Switching circuitry, operating under the control of controller, may additionally convert power from either, AC grid, or DC supply, to recharge DC power storage device(s). Moreover, switching circuitry, operating under the control of controller, may further convert power from DC storage device(s) to be supplied to either AC grid, or DC supply. Such power conversions may involve rectification, inversion, voltage boosting, or voltage reduction.

The electric machine can, for example, take the form of an electric machine of an electric vehicle (e.g., plug-in fully electric vehicle or plug-in hybrid electric vehicle) that during operation of the electric vehicle acts as a traction motor and/or a regenerative braking generator to charge a traction motor battery of the electric vehicle.

The AC power grid can take the form of any conventional AC power grid, and may supply electric power to an electric power node or receptacle of a household, recharging station, or commercial facility via one or more transformers at suitable voltages (e.g., 120 V, 220 V, 240 V, or 277 V single phase, or 208 V, 380 V, 400 V or 480 V three phase).

Controller may take a variety of forms according to various embodiments. For example, controller 104 may take the form of a microcontroller, microprocessor, application specific integrated circuit or programmable gate array. Controller is operative to coordinate and adjust operation of the coil driver system, providing a memory, an instruction processor, analog-to-digital (A/D) conversion, digital input and output (I/O), timing functions, as well as data communications. Instructions executable by controller 104 may be provided as firmware stored in a non-volatile data store such as a flash electrically-erasable read-only memory (EEPROM), or other at least one suitable non-transitory storage medium.

In some embodiments, controller 104 may be interfaced with a user interface (UI) (not shown). The UI may be implemented via a dedicated local operator interface (LOI) device that may include a display or electronic indicators, and at least one input device, such as one or more pushbutton, knob, wheel, touchscreen, or the like. In other embodiments, the UI of controller may be implemented using a UI of the EV. In this example, the UI of the EV may be communicatively coupled to a serial-communications interface of controller 104 via a communication bus of the EV, such as an inter-integrated circuit (I2C) bus, controller area network (CAN) bus, or the like. In other examples, the UI may be implemented via a communicatively-coupled computing device, such as a smartphone, tablet, personal computer (PC), or the like, which may communicate directly with controller via a personal-area network (PAN) such as an IEEE 802.15.1 network, commonly referred to as Bluetooth or Bluetooth Low Energy (BLE), or indirectly, such as over the Internet through a Web-based server or cloud-based Internet-of-things (IOT) service.

Electrical probes are arranged at the electric power node or input of DC supply. Electrical probes may be implemented using a voltage-probe circuit, such as a high-stability voltage divider circuit across each node, or a current-probe circuit, such as a high-stability shunt resistor in series with the current path to be measured. The probe circuits are coupled to an A/D converter to be sampled and quantized, and ultimately interfaced with controller, which may be programmed to periodically read the voltage output of each voltage-probe circuit or current-probe circuit on a sampling basis. Controller may compute the voltage of each respective measured node, and in the case of AC voltage, controller may computationally determine the AC wave's frequency and phase information, based on zero crossing or PLL or similar.

Controller may use the measured electrical information and, in some embodiments, user input, to configure and control switching circuitry in order to achieve the called-for power-transfer functionality.

One or more components (e.g., processors) of the electric vehicle drive rain can execute a controller program which may be realized via firmware instructions executed on the hardware of the controller, such as controller. The controller program includes motor driver processor-executable instructions, battery charging processor-executable instructions, and supply processor-executable instructions. Motor driver processor-executable instructions is operative to run electric machine from battery(ies). When the electric vehicle is stationary, the electric machine may be powered primarily from AC power grid or from DC supply and, secondarily, from battery(ies) as backup. Motor driver processor-executable instructions may implement an inverter, such as an H-bridge circuit, variable-frequency drive, field-oriented control (FOC), or other suitable motor-driving technique. In embodiments that implement regenerative braking, motor driver processor-executable instructions are operative to feed power from machine back to battery(ies), which may include converting the power generated by the rotating machine into a suitable DC voltage for charging battery(ies).

Battery charging processor-executable instructions operate the switching circuitry as a power converter to produce DC power for charging battery(ies). The switching circuitry may receive input power from AC power grid (or a grid-independent AC source), or DC supply. Accordingly, the input voltage may vary considerably, and call for different voltage-regulation techniques (e.g., boost, buck, etc.) for which the switching circuitry of the coil driver system may be dynamically configured. Notably, in battery-charging mode, the coil driver system utilizes the windings of machine as one or more inductors, as indicated at.

Supply mode processor-executable instructions are operative to transfer power from battery(ies) to AC power grid or DC supply (for instance, where DC supply includes a DC bus that may power other equipment). In supply mode, the switching circuitry of coil driver system may perform inversion to generate an AC wave, and voltage conversion (boosting or reduction), and utilize the windings of machine as one or more inductors, as indicated at. For supplying power to AC power grid, voltage measuring of the grid voltage is used by the controller of system to synchronize the generated waveform of the inverter output with the phase of the AC power grid. By way of example, the controller may implement a phase-locked-loop (PLL)-based control scheme to track the phase of the AC waveform. Voltage or current measurement may be used to control the amount of the power transfer.

Notably, in some embodiments, each of these modes of operation or configurations is carried out at different times, but using the same switching circuitry 106 such that certain switches may implement different modes of operation at different times in corresponding different circuit topologies. For instance, in a motor driver mode, a given switch of switching circuitry 106 may be a leg of an H-bridge motor-driving topology; whereas in a battery charging mode 254, the same switch may operate as a switching regulator of a boost converter.

In a grid-tie arrangement according to a type of embodiment, in which one, or a group of electrical storage devices may be charged from an AC power grid, and, separately, used to supply power to the AC power grid. The electric vehicle drive train may comprises a three-phase electric machine with three pairs of windings, and a rotor. The electric machine 302 may be a traction motor of an EV, or other type of motor or generator.

The electric vehicle drive train may further include switching circuitry, and a controller that executes switching logic according to at least battery-charging processor-executable instructions and supply mode processor-executable instructions. The electric vehicle drive train can also include a plurality of electrical probes, for example a first set of AC voltage probes, and a first set of DC voltage probes which are communicatively coupled to the controller to provide signals representative of the measured voltages. While not illustrated, the electric vehicle drive train can employ other sensors, for examples sensors to positioned or coupled to sense the operational aspects (e.g., rotational speed, rotational position of the rotor, temperature) of the electric machine or components thereof.

The electric vehicle drive train is electrically coupled to an AC power grid, which may be available via a single-phase mains power tap, or a three-phase supply, as shown. The electric vehicle drive train is also electrically coupleable to one or more DC power storage devices, for instance, a number of traction motor secondary batteries of one or more EVs which may be part of a fleet of electric vehicles. In other applications, the DC power storage device(s) may be operated via a battery control system (BCS) as described, for example, in U.S. patent application Ser. No. 13/842,213 entitled "Battery Control Systems and Methods," the disclosure of which is incorporated by reference herein.

The controller of the electric vehicle drive train is operative to control the switches to operate, at least during a first period, as a power converter according to battery charging mode to receive AC power from the AC power grid and to output DC power of an appropriate voltage for the DC power storage devices (e.g., traction motor secondary batteries or BCS. The controller of the electric vehicle drive train is operative according to supply mode to control the switches to operate, at least during a second period, as a power converter to receive DC power from the DC power storage devices (e.g., traction motor secondary batteries or BCS) and output AC power (single or three-phase) to the AC power grid 320 at an appropriate voltage and in-phase with the AC power grid. In particular, the controller can open and close (turn ON and OFF) various switches to couple selected windings of the electric machine 302 as inductors of one or more power converter architectures.

For most electric machine types there are numerous control methods that may be employed and most are appropriate for the disclosed switching control system, including frequency/voltage-f/V ratio control systems, 6 step inverters, pulse width modulated (PWM) inverters, Space Vector, Field Oriented Control (FOC), etc. Many of these designs have options that may play a role in determining the best way to integrate the technology given certain circumstances and desired outcomes. As an example, the FOC systems may be sensor-less, or may use encoders, Hall effect sensors, or other components with feedback loops to assist in the control of the system. While the technology may be applied to many electric machine designs, in at least one implementation of the technology into a Permanent Magnet Synchronous Machine (PMSM) using a Field Oriented Control topology with a phase locked loop based in input from a set of AC voltage probes.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to control systems for electric machines, not necessarily the exemplary systems, methods, and apparatus generally described above.

The various embodiments described above can be combined to provide further embodiments. All of the US patents, US patent application publications, US patent applications, foreign patents, foreign patent applications and non-patent publications referred to in this specification and/or listed in the Application Data Sheet, including but not limited to U.S.

patent application Ser. No. 13/393,749, filed May 15, 2012; U.S. Pat. No. 7,081,696; U.S. Patent Application Publication No. 2008088200; U.S. Provisional Patent Application No. 60/094,007, filed Sep. 3, 2008, U.S. Provisional Patent Application Ser. No. 61/239,769, filed Sep. 3, 2009; U.S. patent publication No. 2012-0229060; U.S. patent publication No. 2011-0241630; U.S. Pat. No. 8,106,563; U.S. patent publication No. 2010-0090553; U.S. patent publication No. 2014-0252922; International patent application PCT/CA2018/050222 (published as WO 2018/213919); International patent application PCT/CA2019/051238 (published as WO 2020/047663); and U.S. patent application Ser. No. 13/842,213; US Pat. Publ. No. 20230011977A1; US2021/0359523; and International Pat. Publ. No. WO2018/213919; US Pat. Publ. No. 2022/0360091 A1; US 2022/0368135 (415C1); US2021/0359523, and U.S. patent application 63/469,617 filed May 30, 2023, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of 35 U.S.C. § 114(f), are not to be invoked unless the specific terms "means for" or "step for" are recited in a claim.

The invention claimed is:

1. An electric vehicle drive train, comprising:

a direct current (DC) voltage bus; the DC voltage bus having a variable DC link voltage that is controllable;

an electric machine comprising a set of coils or windings;

a coil driver system, the coil driver system operable in a plurality of modes, to configure the coils or windings of the electric machine as a power converter to selectively: invert, rectify, boost voltage and reduce voltage, wherein the coil driver system is selectively electrically couplable to an alternating current (AC) grid or a grid-independent AC power source and operable in a first mode of the plurality of modes to configure the set of coils or windings of the electric machine to import power therefrom and operable in a second mode of the plurality of modes to configure the set of coils or windings of the electric machine to export power thereto, and wherein the coil driver system is operable in at least a third mode of the plurality of modes to configure the set of coils or windings of the electric machine based at least in part on speed and torque demands;

at least one of:

a power source control system operable to perform cell switching, implementing cell selection, active balancing, and/or the variable DC link voltage across the DC voltage bus between a battery and the coil driver system; or a fuel cell system operable supply the variable DC link voltage across the DC voltage bus between at least one fuel cell and the coil driver system.

2. The electric vehicle drive train of claim 1, further comprising a traction battery electrically coupled to the power source control system.

3. The electric vehicle drive train of claim 1, wherein the coil driver system is operable in at least the third mode of the plurality of modes to configure the set of coils or windings of the electric machine based at least in part on speed and torque demands to two torque profiles within switch between a series arrangement of the coils or windings to produce a relatively high torque at a relatively low base speed and a parallel arrangement of the coils or windings to produce a relatively low torque and a relatively high base speed.

4. The electric vehicle drive train of claim 1, wherein the coil driver system configures the set of coils or windings of the electric machine as a rectifier to rectify power from a three (3) phase AC grid or from a single phase AC power source to charge the battery of an electric vehicle of which the electric vehicle drive train is a part via the DC voltage bus.

5. The electric vehicle drive train of claim 1, wherein the coil driver system configures the set of coils or windings of the electric machine as a rectifier to rectify power generated by the electric machine to charge the battery of an electric vehicle of which the electric vehicle drive train is a part via the DC voltage bus.

6. The electric vehicle drive train of claim 1, wherein the coil driver system configures the set of coils or windings of the electric machine as a DC-DC converter to adjust a voltage of power from a DC source to charge the battery of an electric vehicle of which the electric vehicle drive train is a part via the DC voltage bus.

7. The electric vehicle drive train of claim 1, wherein the coil driver system operates as an inverter to power the set of coils or windings of the electric machine from DC power supplied by the battery of an electric vehicle of which the electric vehicle drive train is a part or from another DC power source via the DC voltage bus.

8. The electric vehicle drive train of claim 1, wherein the coil driver system configures the set of coils or windings of the electric machine as inductors of a buck power converter or a boost mode power converter.

9. A method of operation of an electric vehicle drive train, the method comprising:

at a first time, configuring, by a controller of a switching circuitry of a coil driver system, a set of coils or windings of a traction motor to implement a first one of at least two torque profiles depending on a speed and/or torque demand;

at a subsequent time, reconfiguring, by the controller of the switching circuitry of the coil driver system, the set of coils or windings of the traction motor to implement a second one of the at least two torque profiles depending on change in a speed and/or torque demand;

at another time when the coil driver system is selectively electrically coupled to an alternating current (AC) grid or a grid-independent AC power source, configuring, by the controller of the switching circuitry of the coil driver system, the set of coils or windings of the traction motor to import power from the AC grid or a grid-independent AC power source; and at yet another time when the coil driver system is selectively electrically coupled to an alternating current (AC) grid or a grid-independent AC power source, configuring, by the controller of the switching circuitry of the coil driver system, the set of coils or windings of the traction motor to export power the AC grid or a grid-independent AC power source, whereby the coil driver system configures the coils or windings of the traction motor as a power converter to selectively: invert, rectify, boost voltage and reduce voltage;

and adjusting a variable direct current (DC) link voltage across a DC voltage bus electrically coupled to the coil driver system at one of the times.

10. The method of claim 9 wherein adjusting a DC link voltage includes:

reconfiguring, by a controller of a power source or cell control system, a set of power source cells electrically coupled to provide a voltage to the DC voltage link.

11. The method of claim 9 wherein adjusting a DC link voltage includes:

controlling a fuel cell system electrically coupled to provide a voltage to the DC voltage bus.

12. The method of operation of the electric vehicle drive train of claim 9, wherein for each of a plurality of modes, configuring, by the coil driver system, the set of coils or windings of the traction motor to implement a respective circuit topography using some or all of a single set of switching circuitry at respective times.

13. The method of operation of the electric vehicle drive train of claim 9, wherein, at one of the first time or the subsequent time, configuring, by the coil driver system, the set of coils or windings of the traction motor in a series arrangement of the coils or windings to produce a relatively high torque at a relatively low base speed and at another one of the first time or the subsequent time, configuring, by the coil driver system, the set of coils or windings of the traction motor in a parallel arrangement of the coils or windings to produce a relatively low torque and a relatively high base speed.

14. The method of operation of the electric vehicle drive train of claim 9, including configuring, by the coil driver system, the set of coils or windings of the traction motor as a rectifier to rectify power from a three (3) phase AC grid or from a single phase AC power source to charge a battery of an electric vehicle of which the electric vehicle drive train is a part via the DC voltage bus.

15. The method of operation of the electric vehicle drive train of claim 9, including configuring, by the coil driver system, the set of coils or windings of the traction motor as a rectifier to rectify power generated by the traction motor to charge a battery of an electric vehicle of which the electric vehicle drive train is a part via the DC voltage bus.

16. The method of operation of the electric vehicle drive train of claim 9, including configuring, by the coil driver system, the set of coils or windings of the traction motor as a DC-DC converter to adjust a voltage of power from a DC source to charge a battery of an electric vehicle of which the electric vehicle drive train is a part via the DC voltage bus.

17. The method of operation of the electric vehicle drive train of claim 9, including configuring, by the coil driver system, the set of coils or windings of the traction motor as an inverter to power the set of coils or windings of the traction motor from DC power supplied by a battery of an electric vehicle of which the electric vehicle drive train is a part or from another DC power source via the DC voltage bus.

* * * * *